United States Patent [19]

Glaab et al.

[11] Patent Number: 4,951,142

[45] Date of Patent: Aug. 21, 1990

[54] METHOD AND APPARATUS FOR TRANSMISSION OF SYNCHRONIZATION SIGNALS BETWEEN MICROPROCESSORS IN VIDEO SYSTEM

[75] Inventors: Friedrich Glaab, Hochst; Uwe Ritter, Darmstadt; Rainer Sturm, Gross-Gerau, all of Fed. Rep. of Germany

[73] Assignee: BTS Broadcast Television Systems GmbH, Darmstadt, Fed. Rep. of Germany

[21] Appl. No.: 188,420

[22] Filed: Apr. 29, 1988

[30] Foreign Application Priority Data

May 9, 1987 [DE] Fed. Rep. of Germany ....... 3715595

[51] Int. Cl.[5] .............................................. H04N 5/04
[52] U.S. Cl. .................................... 358/148; 358/185; 358/903; 340/825.14
[58] Field of Search ............... 358/185, 148, 425, 903; 377/107, 52; 340/825.14

[56] References Cited

U.S. PATENT DOCUMENTS

| | | | |
|---|---|---|---|
| 3,955,069 | 5/1976 | Ziemba | 377/52 |
| 3,981,440 | 9/1976 | Richardson | 377/52 X |
| 3,982,199 | 9/1976 | Green | 377/107 X |
| 4,063,220 | 12/1977 | Metcalfe et al. | 370/85 X |
| 4,099,024 | 7/1978 | Boggs et al. | 370/85 X |
| 4,165,520 | 8/1979 | Wessler et al. | 358/425 X |
| 4,330,751 | 5/1982 | Swain | 377/107 X |
| 4,553,218 | 11/1985 | Genrich | 377/107 X |
| 4,558,457 | 12/1985 | Tabata | 377/107 |
| 4,622,481 | 11/1986 | Nortrup | 377/107 X |
| 4,700,184 | 10/1987 | Noirel et al. | 340/825.14 X |

Primary Examiner—Howard W. Britton
Assistant Examiner—Victor R. Kostak
Attorney, Agent, or Firm—Frishauf, Holtz, Goodman & Woodward

[57] ABSTRACT

In order to couple together vertical-frequency synchronization signals generated by a computer connected to an data transmission system, the synchronization signals are generated by counting the clock pulses. A reference signal is transmitted to the computer or processor; the reference has a frequency which is a whole-number fraction of the desired frequency. Upon receipt in the processor (16) of the reference signal, a counter (19) provided for counting of the clock pulses is preset.

6 Claims, 1 Drawing Sheet

METHOD AND APPARATUS FOR TRANSMISSION OF SYNCHRONIZATION SIGNALS BETWEEN MICROPROCESSORS IN VIDEO SYSTEM

Cross-reference to related patents, the disclosures of which are hereby incorporated by reference: U.S. Pat. Nos. 4,063,220 and 4,099,024, assigned to Xerox Corporation, owner of the trademark ETHERNET and Reg. No. 1,169,059 therefor.

Cross-reference to related patent applications, assigned to the assignee of the present invention, the disclosures of which are hereby incorporated by reference: U.S. Ser. No. 186,168, filed Apr. 26, 1988, GLAAB, now abandoned in favor of F.W. continuation Ser. No. 333,757, filed Apr. 3, 1989, claiming priority of Fed. Rep. Germany application No. P 37 15 594 of May 9, 1987, U.S. Ser. No. 191,011, filed May 6, 1988, CLAUSS & RITTER, now abandoned in favor of F. W. continuation Ser. No. 441,199, filed Nov. 22, 1989 claiming priority of Fed. Rep. Germany application No. P 37 16 318.3 of May 15, 1987.

The present invention relates generally to a method of synchronizing various broadcasting studio computers, and more specifically to a way of transmitting synchronization signals over a local area network without a lot of dedicated circuits.

BACKGROUND

Computers are used in television studio devices and installations for various control tasks. Often multiple computers are used in a single installation, each performing a specialized assignment, such as the control of a tape drive, control of a video processor, calculation and storage of color correction values, and coordination of time coding signals. For several such assignments, time coupling with the vertical-frequency synchronization signals of the television system is necessary. For example, changes in the parameters of the video signal are regularly undertaken during the vertical blanking interval in order to avoid visible disturbances in the picture. Therefore, in conventional systems, synchronization signals are fed to the individual computers or microprocessors. To the extent that data transmission in conventional systems is not in a timing pattern compatible with the television system anyway, supplemental connections for the "synch" signal are necessary.

THE INVENTION

Accordingly, it is an object of the present invention to obviate the need for supplemental synchronization signal connections in a broadcasting studio installation.

Briefly, the method and apparatus of the present invention accomplishes synchonization by transmitting synchronization information as one of the data packets on a local area network. The method of the present invention has the advantage that no additional conductors between the computers are needed, beyond those required anyway. The coupling requires such a small additional transfer capacitance that the transmission of the remaining data is practically unimpaired.

The additional feature of deriving a reference signal by frequency division of vertical-frequency studio clock signal simplifies the electronic components required.

It is particularly advantageous if the apparatus used for carrying out the method of the invention is a nondeterministic local area network having a serial data bus.

In such local area networks, there can be collisions between individual data packets. These collisions require retransmission of the data packet. If the capacitive loading of the local area network is not too great, the resulting delays generally fall within the tolerances which are permissible for the above-noted purposes. However, should a greater delay result, for example due to multiple collisions, in another embodiment of the invention, the evaluation of the more-than-usually-delayed reference signal can be omitted. Until the following reference signal, the vertical-frequency synchronization pulses are generated without phase correction.

DRAWINGS

Various embodiments of the invention are schematically illustrated in the accompanying drawings, of which FIG. 1 is a block diagram of a first embodiment; and FIG. 2 is a fragmentary block diagram of a second embodiment.

Corresponding elements of the embodiments are assigned the same reference numerals in the figures.

DETAILED DESCRIPTION

Figure 1:
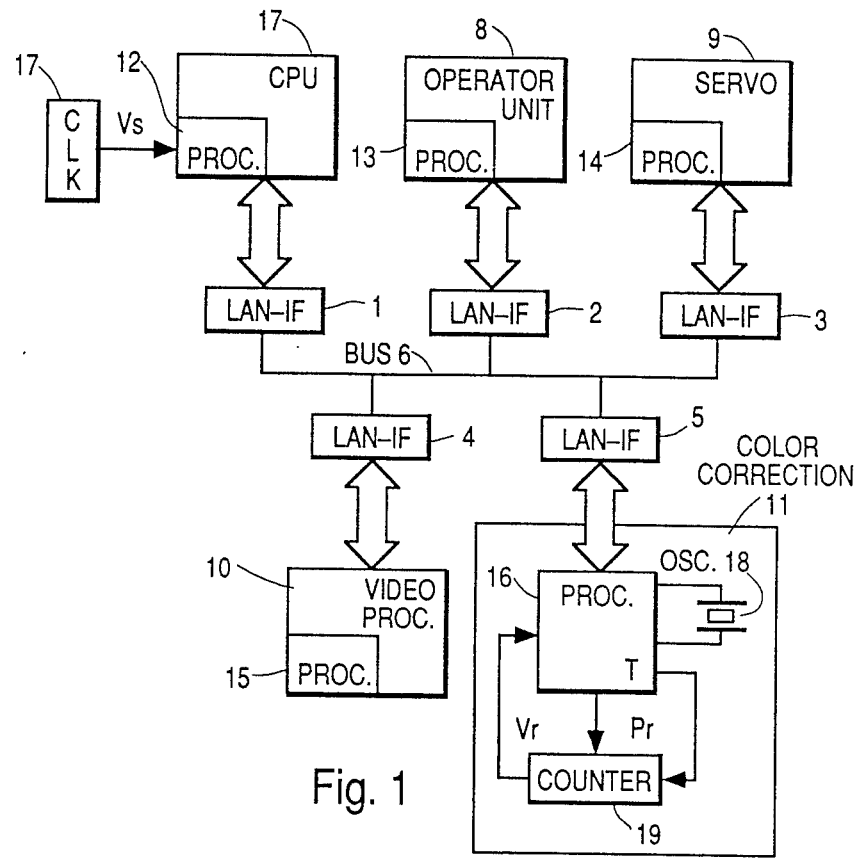

FIG. 1 illustrates a local area network (LAN) with five transmit/receive devices (LAN-IF) 1-5, which are interconnected by a cable 6. A local area network according to IEEE Specification 802.3 is suitable. Two such local area networks have become known by the designations ETHERNET and CHEAPERNET, and are described in detail in the publicly available literature and U.S. Pat. Nos. 4,063,220 and 4,099,024.

A number of features will become apparent from the following short description of a preferred embodiment. The cable 6, representing the serial bus, interconnects all the participating devices, which are connected to the cable via the output stages of a transmitter and the input stages of a receiver. The data are transmitted at a data rate of 10 megabits per second. The data to be transmitted are assembled into data frames or packets, each of which begins with a preamble, which is followed by the destination address and the source address. Thereafter follows information about the length of the following data field, which in turn is followed by a few bytes for error recognition purposes. Prior to transmission of such a data packet, the station in question checks whether another station is already transmitting. This is accomplished by the Carrier Sense (CS) method. Despite this check, a collision can occur if two stations start to transmit almost simultaneously, or within the "time window" caused by cable transmission time. In that event, the data packets are repeated after a time delay determined by random number generators.

The local network interconnects various components of a television studio installation, e.g. of a film scanner. For explanation of the present invention, there are shown a central processing unit (CPU) 7, an operator's unit 8, a servo system 9 for film transport, a video processor 10 and a color correction unit 11. For ease of understanding, these devices are represented in the drawing as respective blocks or boxes. For processing of their respective data, each of the units 7 through 11 contains, among other elements (not shown), a respective processor 12 through 16.

The method of the present invention will be described in connection with the following description of the color correction unit 11. An object of the method of the invention is to assure that color correction signals are altered only during the vertical blanking interval, in order to avoid visible disturbances in the picture. Since other units connected to the local network also carry out operations coupled to the vertical blanking interval, the vertical -frequency synchronization signals generated in these devices are coupled to a "Vs-pulse" from a studio clock 17. In processor 12 of the central processor 7, the V-pulses are counted, and, after every 64th V-pulse, a predetermined data frame or packet is generated. This is transmitted via the transmit/receive device 1 and cable 6 to the other stations of the local network. The known local networks offer the possibility of addressing all other, or a selected group of, station, by corresponding addressing. In this manner, the data packet which serves as a reference signal travels, inter alia, via transmit/receive device 5 to the processor 16 for the color correction unit 11.

Processor 16 is provided, in a manner known per se, with quartz oscillator 18, with whose help a clock signal T, of very precise frequency, is generated. This clock signal is fed to a counter 19, whose capacity corresponds to the ratio between the clock frequency and the vertical frequency of the television system. Thus, a vertical-frequency synchronization signal Vr is available at an overflow output of counter 19. This signal is fed back into processor 16, in order to trigger the output of the previously provided color correction values.

Counter 19 is preset after arrival from processor 16 of the data packet serving as the reference signal, in order to couple synchronization signal Vr with synchronization signal Vs. Since the frequency deviations of quartz oscillator 18 with respect to the studio clock signal are extremely minor, there results a precision of synchronization signal Vr which is entirely sufficient for the intended use, even if the correction of phase position, by the presetting, occurs relatively seldom.

In the quartz oscillators usually used for microprocessors, the deviation is at most $10^{-6}$, while the studio clock signal has a negligible uncertainty of $10^{-8}$. Thus, given the aforementioned frequency deviation of the clock signal T, the phase deviation will remain within acceptable tolerances, even if one pulse of the reference signal is missed and counter 19 is not preset until after 128 V-periods.

Figure 2:
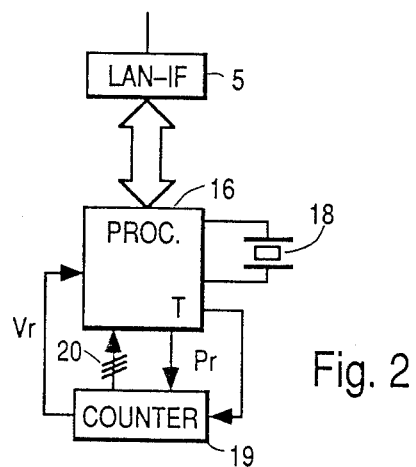

FIG. 2 illustrates a further refined embodiment of the invention, featuring a modified connection of processor 16. As in the embodiment of FIG. 1, clock signal T is applied to a counter 19, whose overflow output is connected to an input of processor 16, and presetting of counter 19 is accomplished with the aid of a signal generated by processor 16. Additionally, counter 19 is connected via parallel lines 20 to processor 16, so that the processor can read out the instantaneous counter state. That portion, of the program stored in the processor, which is devoted to the coupling between signals Vr and Vs, contains a counter state interrogation routine, actuated whenever a reference signal is received via the transmit/receive device 5, shown in FIG. 1.

If comparison determines that the reference signal was transmitted at the correct time, i.e. without the aforementioned delay due to collision, the processor sends a PRESET signal to counter 19. However, if the reference signal does not occur near the zero value of counter 19, no PRESET takes place.

The data packet or frame serving as the reference signal can contain, in addition to the data required by the processor for recognition of the reference signal, further information whose regular transmission is advantageous. For example, the time of day can be transmitted along with the reference signal Various changes and modifications are possible within the scope of the inventive concept, and features of any embodiment may be combined with features of any other embodiment.

We claim:

1. In a data processing system having a plurality of individual processors (16) each generating a respective vertical-frequency synchronization signal, and connected together over data transmission means (6), a method of rendering said synchronization signals coincident, comprising the steps of obtaining each synchronization signal by counting clock pulses of the respective processor (16);

feeding to each said processor (16), via said data transmission means, a reference signal, said reference signal having a frequency which is a whole-number fraction of the desired frequency of the synchronization signal; and upon receipt in each said processor (16) of said reference signal, resetting a counter (19) provided for counting of said clock pulses.

2. Method according to claim 1, wherein said reference signal is generated by frequency division of a vertical-frequency signal.

3. Method according to claim 1, wherein said whole-number fraction is 1/64.

4. Method of coupling together vertical-frequency synchronization signals generated by a processor (16) connected to a data transmission system, comprising the steps of obtaining synchronization signals by counting clock pulses of the processor (16);

feeding to said processor (16), via said data transmission system, a reference signal, said reference signal having a frequency which is a whole-number fraction of the desired frequency of the synchronization signal; and upon receipt in said processor (16) of said reference signal, resetting a counter (19) provided for counting of said clock pulses, and wherein said feeding step includes transmitting said reference signal to a plurality of processors (12-16), each generating a synchronization signal.

5. Method according to claim 4, wherein said reference signal is generated by frequency division of a vertical-frequency signal.

6. Method according to claim 4, wherein said whole-number fraction is 1/64.

* * * * *